(12) United States Patent
Cui et al.

(10) Patent No.: US 8,885,514 B2
(45) Date of Patent: Nov. 11, 2014

(54) ASSIGNING SOURCE NODES TO A SELECT GROUP IN A WIRELESS COMMUNICATION NETWORK

(75) Inventors: Shengshan Cui, San Diego, CA (US); Alexander Mircea Haimovich, North Brunswick, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 766 days.

(21) Appl. No.: 12/512,792

(22) Filed: Jul. 30, 2009

(65) Prior Publication Data

US 2011/0026451 A1    Feb. 3, 2011

(51) Int. Cl.
*H04L 12/28* (2006.01)
*H04B 7/155* (2006.01)

(52) U.S. Cl.
CPC ...................... *H04B 7/155* (2013.01)
USPC ............................ 370/254; 370/400; 370/437

(58) Field of Classification Search
CPC ...... H04W 40/32; H04W 84/18; H04L 41/12; H04L 45/02; H04B 7/0621; H04B 7/0626
See application file for complete search history.

(56) References Cited

U.S. PATENT DOCUMENTS

| | | | | |
|---|---|---|---|---|
| 4,519,068 A | * | 5/1985 | Krebs et al. | 370/329 |
| 8,149,732 B1 | * | 4/2012 | Borro et al. | 370/254 |
| 2003/0204623 A1 | * | 10/2003 | Cain | 709/241 |
| 2006/0098627 A1 | * | 5/2006 | Karaoguz et al. | 370/352 |
| 2008/0144562 A1 | * | 6/2008 | Draper et al. | 370/315 |
| 2008/0192702 A1 | * | 8/2008 | Song et al. | 370/332 |
| 2008/0318520 A1 | * | 12/2008 | Kwun et al. | 455/7 |
| 2009/0005028 A1 | | 1/2009 | Haimovich | |
| 2009/0143008 A1 | * | 6/2009 | Hottinen et al. | 455/11.1 |
| 2010/0214930 A1 | * | 8/2010 | Hu et al. | 370/241 |

OTHER PUBLICATIONS

Cui et al, Decentralized Two-Hop Opportunistic Relaying With Limited Channel State Information, Jul. 6-11, 2008, IEEE, pp. 1323-1327.*
Shengshan Cui, Alexander M. Haimovich, Opportunistic Relaying in Wireless Networks, IEEE International Symposium on Information Theory 2008, Jul. 6-11, 2008.
Shengshan Cui, Alexander M. Haimovich, Oren Somekh, Vincent Poor, Opportunistic Relaying in Wireless Networks, IEEE International Symposium of Information Theory 2008, Jul. 6-11, 2008, (Revised Jan. 6, 2009).
Cui, Shengshan, et al., Throughput Scaling of Wireless Networks with Random Connections, draft manuscript submitted Sep. 23, 2008.
Cui, Shengshan, et al., Throughput scaling of wireless networks with random connections, IEEE International Conference on Communications, Jun. 14-18, 2009, pp. 1-6.
Gowaikar, Radhika, et la., Communication over a wireless network with random connections, IEEE Transactions on Information Theory, Jul. 2006, vol. 52, No. 7, pp. 2857-2871.

* cited by examiner

*Primary Examiner* — Andrew Chriss
*Assistant Examiner* — Salvador E Rivas
(74) *Attorney, Agent, or Firm* — Turk IP Law, LLC

(57) ABSTRACT

Implementations and techniques for assigning source nodes to a select group in a wireless communication network are generally disclosed.

18 Claims, 8 Drawing Sheets

700 A computer program product.

702 A signal bearing medium.

704 at least one of machine-readable instructions, which, if executed by one or more processors, operatively enable a computing device to:

receive a channel state information signal from at least one source node assigned to a select group of two or more groups of source nodes, wherein the select group of source nodes is associated with a portion of a set of relay nodes;

send a channel state information feedback to the at least one source node, wherein the channel state information feedback is based at least in part on a reliability metric associated with the channel state information signal; and/ or receive, via the portion of a set of relay nodes, one or more data packets from a select source node scheduled for serivce based at least in part on the channel state information feedback.

| 706 a computer-readable medium. | 708 a recordable medium. | 710 a communications medium. |

FIG. 7

ASSIGNING SOURCE NODES TO A SELECT GROUP IN A WIRELESS COMMUNICATION NETWORK

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of grant number CNS-0626611 awarded by the National Science Foundation.

BACKGROUND

In wireless communication systems, multiuser diversity may capitalize on independent fading channels across different user devices in order to enhance the throughput in the downlink/uplink of such wireless communication systems. Procedures to schedule service for a given user device based on the best instantaneous channel quality may be useful in terms of ergodic sum-rate for both the uplink and for the downlink. However, such procedures may require user devices to feed back instantaneous channel state information (CSI).

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 illustrates an example computer program product; and

DETAILED DESCRIPTION

Figure 1:
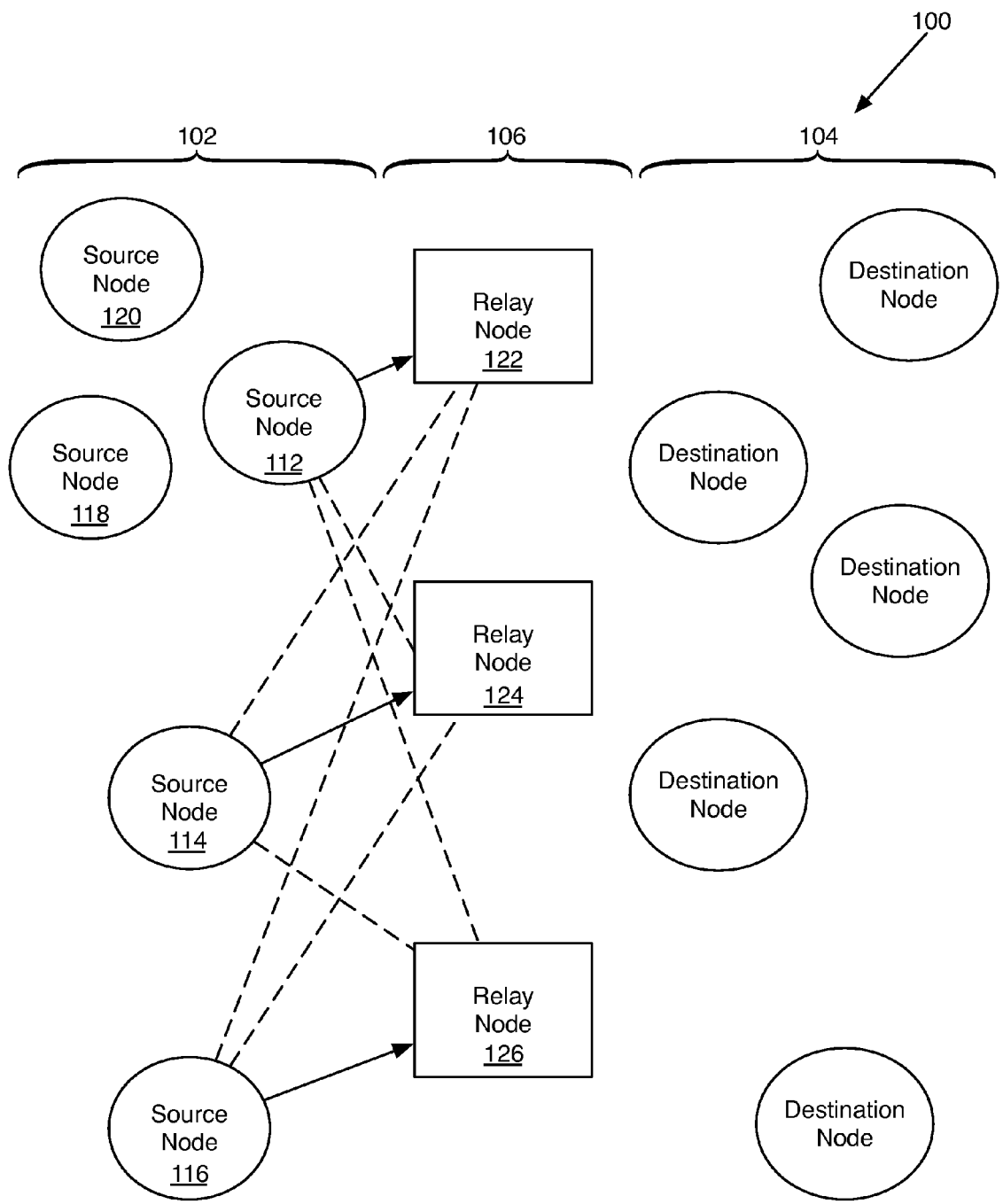
FIG. 1 illustrates a diagram of an example wireless communication network in operation.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and/or computer program products related to assigning source nodes to a select group in a wireless communication network.

FIG. 1 illustrates a diagram of an example wireless communication network 100 in accordance with one or more example implementations. Wireless communication network 100 may include a plurality of source nodes 102. Individual source nodes 102 may be arranged (e.g., coupled) in communication with individual destination nodes 104. Source nodes 102 and/or destination nodes 104 may include portable (or mobile) electronic device such as a cell phone, a personal data assistant (PDA), a personal media player device, a wireless web-watch device, a personal headset device, an application specific device, and/or the like, and/or combinations thereof.

Such communication between pairs of source nodes 102 and destination nodes 104 may be facilitated by relay nodes 106. In some examples, relay nodes 106 may include infrastructure base stations of wireless communication network 100. Additionally or alternatively, in some examples, relay nodes 106 may include portable (or mobile) electronic device such as a cell phone, a personal data assistant (PDA), a personal media player device, a wireless web-watch device, a personal headset device, an application specific device, and/or the like, and/or combinations thereof. Relay nodes 106 may be configured to facilitate a two-step half duplex communication process between pairs of source nodes 102 and destination nodes 104.

In some examples, the first half of the communication process may be from source nodes 102 to the relay nodes 106. In some cases, source nodes 102 may be configured to transmit blindly (e.g. without scheduling) to relay nodes 106; however, such blind transmission may result in an increased amount of interference. In other cases, source nodes 102 may be configured to receive instructions from the relay nodes 106 regarding whether to transmit or not.

For example, source nodes 102 may be adapted to send a pilot signal (illustrated by the dashed lines) to the relay nodes 106. Relay nodes 106 may be configured to measure the signal strength of the pilot signals from source nodes 102. Based at least in part on the signal strength of the pilot signals, the relay nodes 106 may compute a reliability metric that may indicate the channel strength from the source nodes 102. Such a reliability metric may be based at least in part on a ratio of signal to interference plus noise.

Individual relay nodes 106 may be configured to instruct those source nodes 102 with stronger channel strength levels to transmit while those source nodes 102 with weaker channel strength levels may not be instructed to transmit. In the illustrated example, the solid arrows illustrate that source node 112, source node 114, and source node 116, may be instructed to transmit to relay node 122, relay node 124, and relay node 126, respectively. Similarly, source nodes 118 and 120 may be instructed to not transmit to any of relay node 122, relay node 124, and relay node 126.

Figure 2:
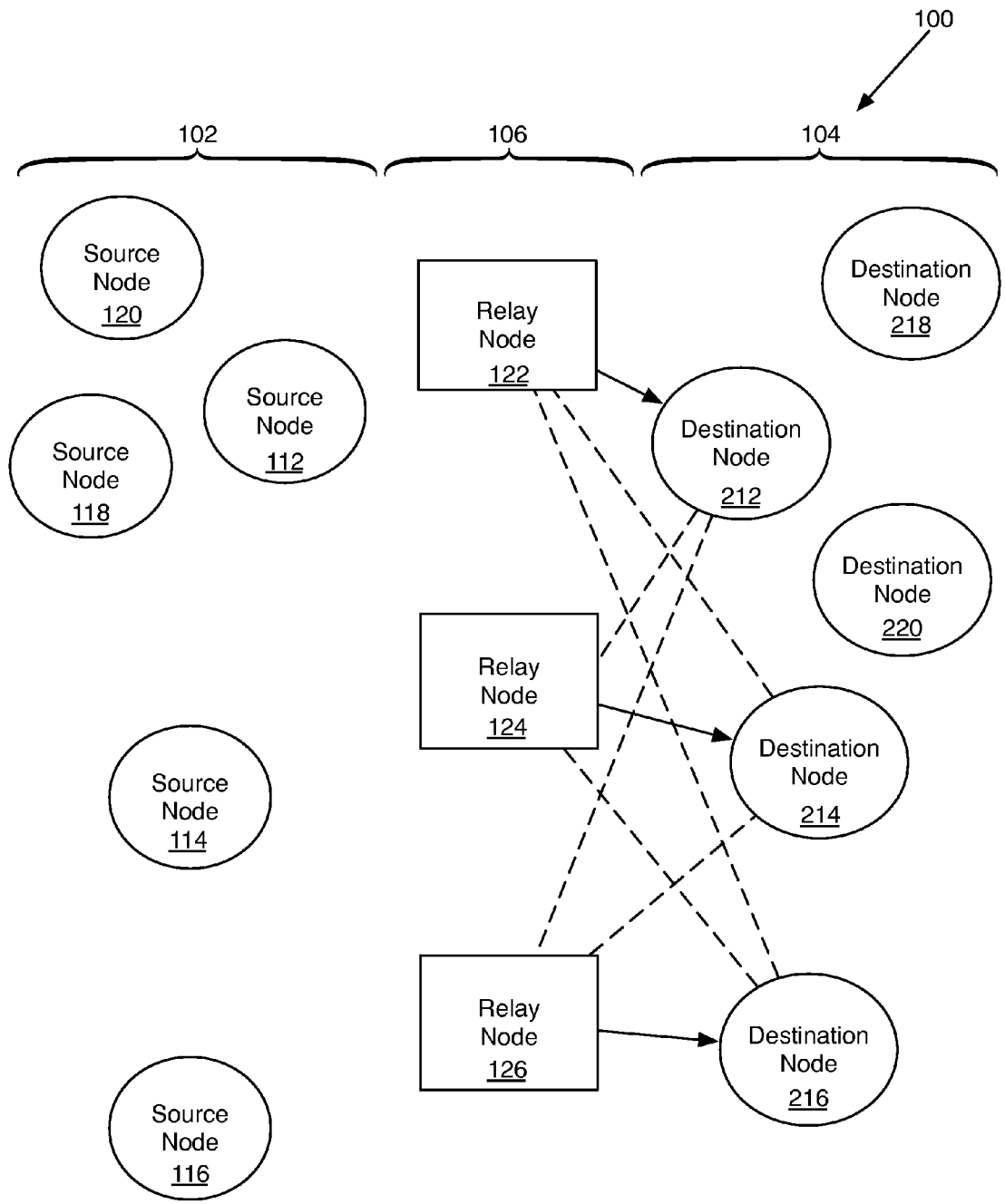
FIG. 2 illustrates a diagram of an example wireless communication network in operation.

FIG. 2 illustrates a diagram of an example wireless communication network 100 in operation, in accordance with one or more example implementations. Packets transmitted from source nodes 102 may be decoded and/or buffered via relay nodes 106 for further transmission to corresponding destination nodes 104. As illustrated, relay nodes 106 may be configured to facilitate a half duplex communication process between pairs of source nodes 102 and destination nodes 104.

In some examples, the scheduling of the communication between relay nodes 106 and destination nodes 104 may be initiated by the destination nodes 104. For example, relay nodes 106 may be configured to send a pilot signal (illustrated by the dashed lines) to the destination nodes 104. Destination nodes 104 may be configured to indicate the signal strength of the pilot signals from relay nodes 106. Based at least in part on the signal strength of the pilot signals, the destination nodes 104 may compute a reliability metric that may indicate the channel strength from the relay nodes 106.

Individual destination nodes 104 may be configured to instruct relay nodes 106 to transmit to destination nodes 104 receiving the stronger channel strength levels while those destination nodes 104 receiving the weaker channel strength levels may not instruct relay nodes 106 to transmit. In the illustrated example, the solid arrows illustrate that relay node 122, relay node 124, and relay node 126 may be instructed to transmit to destination nodes 212, destination nodes 214, and destination nodes 216, respectively. Similarly, destination nodes 218 and 220 may not instruct any of relay node 122, relay node 124, and relay node 126 to transmit.

Figure 3:
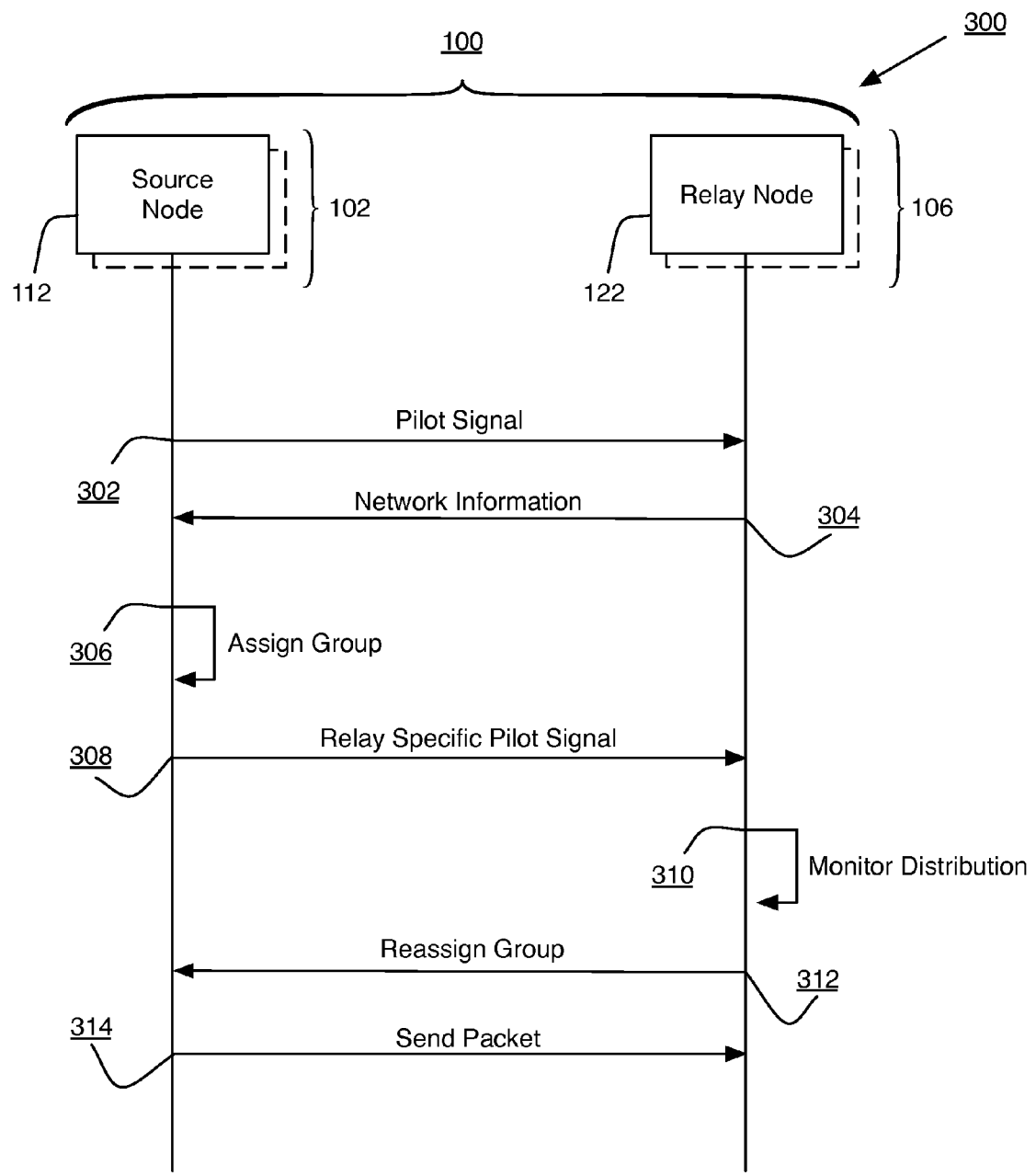
FIG. 3 illustrates an example process for assigning source nodes to a select group in an example wireless communication network.

FIG. 3 illustrates an example process for assigning source nodes to a select group of two or more groups of source nodes in a wireless communication network, in accordance with one or more example implementations. Process 300, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 3 may be practiced in various implementations. For example, although process 300, as shown in FIG. 3, may comprise one particular order of blocks or actions, the order in which these blocks or actions are presented does not necessarily limit claimed subject matter to any particular order. Likewise, intervening actions not shown in FIG. 3 and/or additional actions not shown in FIG. 3 may be employed and/or some of the actions shown in FIG. 3 may be eliminated, without departing from the scope of claimed subject matter. Process 300 may include one or more of functional operations as indicated by example operations 302, 304, 306, 308, 309, 310, 312, and/or 314.

As illustrated, process 300 may be implemented for scheduling individual source nodes 102 from groups (illustrated with respect to FIG. 4, below) of source nodes for service in a wireless communication network 100. In some cases, as the wireless communication network 100 increases in size, there may be a corresponding increase feedback overhead associated with calculating the reliability metric. In such cases, such feedback overhead may be significant depending on the size of wireless communication network 100. Accordingly, source nodes 102 may be grouped to reduce such feedback overhead.

At operation 302, one or more of source nodes 102 may be configured to send a pilot signal to the set of relay nodes 106. At operation 304, one or more of source nodes 102 may be adapted to receive network information from the set of relay nodes 106, in response to such a pilot signal. In some examples, such network information may include network size information.

At operation 306, one or more of source nodes 102 may assign themselves to a select group of two or more groups of source nodes associated with a portion of the set of relay nodes 106. For example source nodes 102 may be divided into two or more groups, where an individual source node (e.g. source node 112) may assign itself to select group of two or more groups of source nodes associated with a portion of the set of relay nodes 106. In some examples, such a portion of the relay nodes 106 may be a single relay node (e.g. relay node 122). In some examples, one or more of source nodes 102 may be adapted to assign themselves to a select group of two or more groups of source nodes based at least in part on the network size information. For example, an individual source node (e.g. source node 112) may be adapted to receive network size information and randomly assign itself to select group of two or more groups of source nodes by flipping a coin to join a select group of two or more groups of source nodes associated with a portion of a set of relay nodes 106.

At operation 308, one or more of source nodes 102 may be arranged to send a relay specific pilot signal to the portion of the set of relay nodes 106 associated with the select group of two or more groups of source nodes. In some examples, an individual source node (e.g. source node 112) may be configured to send a relay specific pilot signal to the associated single relay node (e.g. relay node 122). Such a relay specific pilot signal may be a pilot signal sent via a channel that is assigned to the portion of the set of relay nodes 106 associated with the select group of two or more groups of source nodes.

At operation 310, the portion of the set of relay nodes 106 associated with the select group of two or more groups of source nodes may be arranged to monitor a distribution of the one or more of source nodes 102 among the two or more groups. At operation 312, one or more of source nodes 102 may be arranged to receive communications from the portion of the set of relay nodes 106 associated with the select group of two or more groups of source nodes a reassignment of one or more of source nodes 102 to a second group of source nodes. In some examples, such a reassignment may be based at least in part on a proportional distribution of a set of source nodes 102 among the two or more groups of source nodes. As used herein, the term "proportional distribution" may include equal distribution, approximately equal distribution, and/or a distribution within some specified tolerance. For example, the proportional distribution may not be exactly equal; however it may be helpful for the two or more groups of source nodes to be of a similar magnitude of members.

At operation 314, one or more of source nodes 102 may be arranged to send one or more data packets to the portion of the set of relay nodes 106 associated with the select group of two or more groups of source nodes. For example, after the one or more of source nodes 102 are assigned and/or reassigned to a select group of two or more groups of source nodes associated with a portion of the set of relay nodes 106, the one or more of source nodes 102 may be arranged to send one or more data packets to the portion of the set of relay nodes 106 associated with the select group of two or more groups of source nodes. In some examples, an individual source node (e.g. source node 112) may send one or more data packets to the associated single relay node (e.g. relay node 122). Operation 314 may be described in greater detail below, as illustrated in process 500 of FIG. 5.

Figure 4:
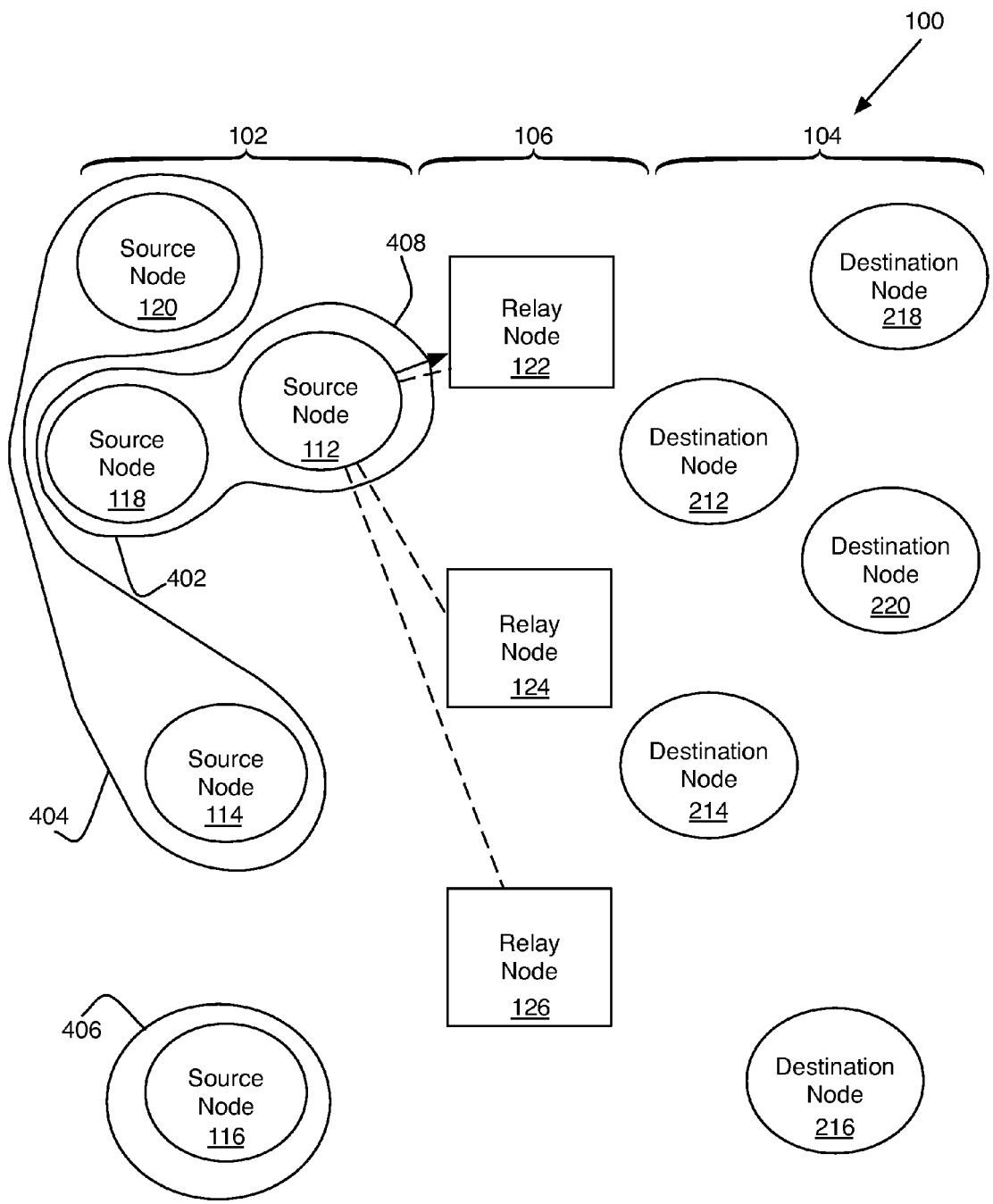
FIG. 4 illustrates a diagram of an example wireless communication network illustrating the operation of the example process of FIG. 3.

FIG. 4 illustrates a diagram of an example wireless communication network illustrating the operation of the example process of FIG. 3, in accordance with one or more example implementations. As illustrated, the first half of the communication process may be from source nodes 102 to the relay nodes 106. In some cases, source nodes 102 may be grouped to reduce feedback overhead from relay nodes 106.

Source nodes 102 may be configured to send a pilot signal to the relay nodes 106. For example, source node 112 may be arranged to send a pilot signal (illustrated by the dashed lines) to relay node 122, relay node 124, and/or relay node 126. Likewise, source nodes 114, 116, 118, and/or 120 may similarly configured to send a pilot signal (not illustrated) to relay node 122, relay node 124, and/or relay node 126.

One or more of source nodes 102 may be configured to assign themselves to a select group of two or more groups of source nodes associated with a portion of the set of relay nodes 106. For example source nodes 102 may be divided into two or more groups (e.g. groups 402, 404, and/or 406), where an individual source node (e.g. source node 112, 114, 116, 118, and/or 120) may be configured to assign itself to a select group (e.g. group 402, 404, and/or 406) associated with a portion of the set of relay nodes 106. In some examples, such a portion of the relay nodes 106 may be a single relay node (e.g. relay node 122). For example, source node 112 may be configured to assign itself to group 402. Group 402 may include other source nodes (e.g. source node 118) and may be associated with a single relay node (e.g. relay node 122). Similarly, group 404 may include one or more source nodes (e.g. source nodes 114 and/or 120) and may be associated with a single relay node (e.g. relay node 124), and group 406 may include one or more source nodes (e.g. source node 116) and may be associated with a single relay node (e.g. relay node 126).

Once one of source nodes 102 is assigned and/or reassigned to one of the groups 402/404/406, such a source node 102 may be configured to send a relay specific pilot signal to the associated relay node 106. In some examples, an individual source node (e.g. source node 112) may be arranged to send a relay specific pilot signal (e.g. relay specific pilot signal 408) to the associated single relay node (e.g. relay node 122). As will be described in greater detail below with respect to FIGS. 5 and 6, the source nodes 102 may be arranged to send one or more data packets to the portion of the set of relay nodes 106 associated with the select group of two or more groups of source nodes (e.g. group 402, 404, and/or 406).

Figure 5:
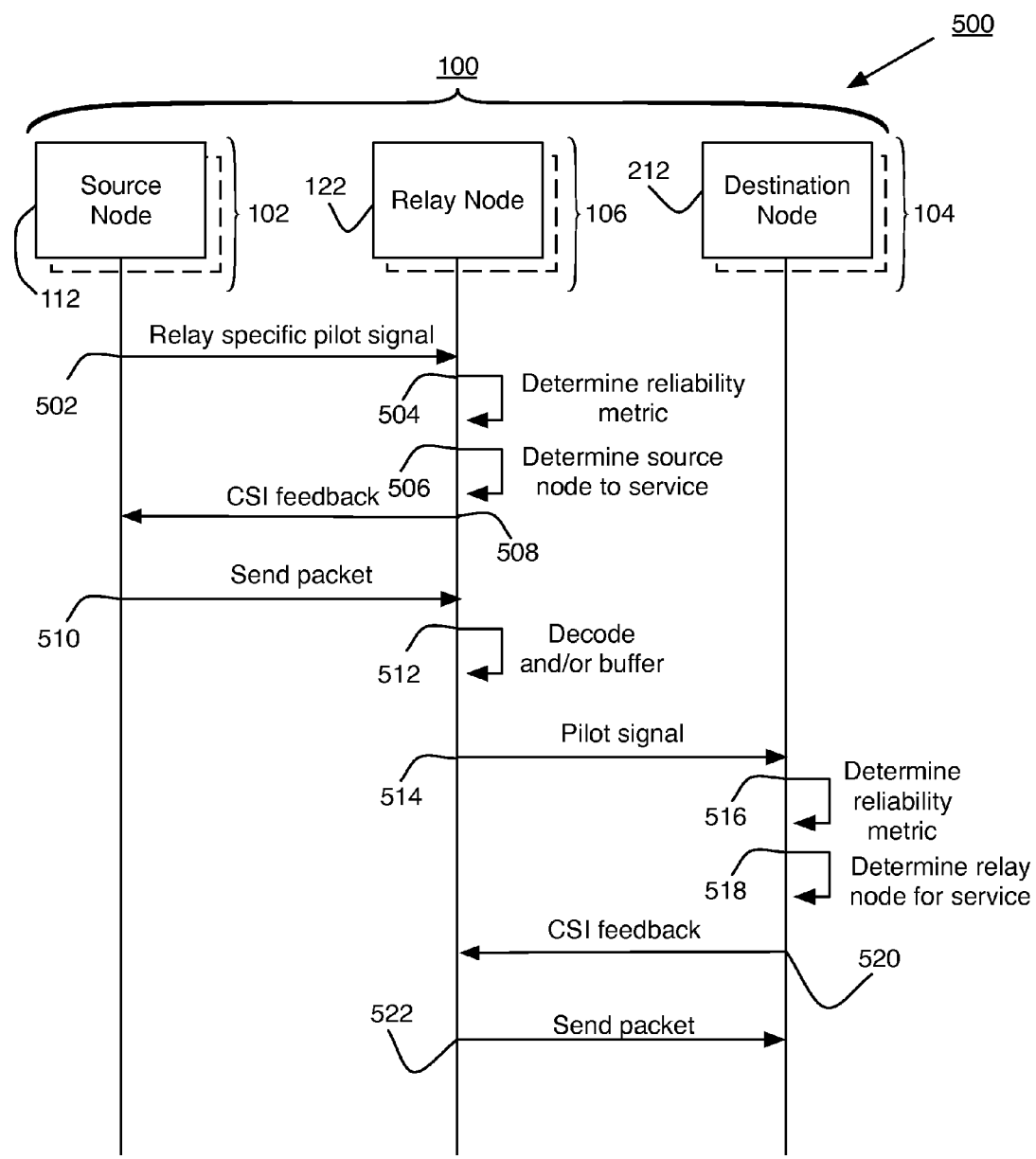
FIG. 5 illustrates an example process for scheduling individual source nodes from groups of source nodes for service in an example wireless communication network.

FIG. 5 illustrates an example process for scheduling individual source nodes from groups of source nodes for service in a wireless communication network, in accordance with one or more example implementations. Process 500, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 5 may be practiced in various implementations. For example, although process 500, as shown in FIG. 5, may comprise one particular order of blocks or actions, the order in which these blocks or actions are presented does not necessarily limit claimed subject matter to any particular order. Likewise, intervening actions not shown in FIG. 5 and/or additional actions not shown in FIG. 5 may be employed and/or some of the actions shown in FIG. 5 may be eliminated, without departing from the scope of claimed subject matter. Process 500 may include one or more function operations as illustrated by example operations 502, 503, 506, 508, 509, 510, 512, 514, 516, 518, 520, and/or 522.

As illustrated, process 500 may be implemented for scheduling individual source nodes 102 from groups of source nodes (illustrated with respect to FIG. 4, above) for service in a wireless communication network 100. At operation 502, one or more of source nodes 102 may be configured to send a relay specific pilot signal to the portion of the set of relay nodes 106 associated with the select group of two or more groups of source nodes. In some examples, an individual source node (e.g. source node 112) may be adapted to send a relay specific pilot signal to the associated single relay node (e.g. relay node 122). Such a relay specific pilot signal may be a pilot signal sent via a channel that is assigned to the portion of the set of relay nodes 106 associated with the select group of two or more groups of source nodes. In some examples, such a relay specific pilot signal may include a channel state information (CSI) signal.

At operation 504, the portion of the set of relay nodes 106 associated with the select group of two or more groups of source nodes may be arranged to determine a reliability metric based at least in part on such a relay specific pilot signal. In examples where such a relay specific pilot signal may include a channel state information signal, such a reliability metric may be determined based at least in part on the channel state information signal. At operation 506, the portion (e.g. relay node 122) of the set of relay nodes 106 associated with the select group of two or more groups of source nodes may be arranged to determine a select source node (e.g. source node 112) assigned to an associated group of source nodes to be scheduled for service based at least in part on the determined reliability metric. For example, such a selection may be made based at least in part on a comparison of reliability metrics associated with two or more of source nodes 102 to find a reliable connection from source nodes 102 to relay nodes 106.

At operation 508, one or more of source nodes 102 may be adapted to receive a channel state information feedback from the portion of the set of relay nodes 106 associated with the select group of two or more groups of source nodes. In some examples, an individual source node (e.g. source node 112) may be adapted to receive a channel state information (CSI) feedback from the associated single relay node (e.g. relay node 122). Such a channel state information feedback may be adapted to instruct an individual source node (e.g. source node 112) to transmit or not to transmit based at least in part on the previously determined reliability metric. For example, an individual source node (e.g. source node 112) may be instructed to transmit via a channel state information feedback based at least in part on a comparison of reliability metrics associated with two or more of source nodes 102 to find a reliable connection from source nodes 102 to relay nodes 106. In some examples, the channel state information feedback may be represented by a binary digit integer value (e.g. a "1" or a "0").

At operation 510, one or more of source nodes 102 may be arranged to send one or more data packets to the portion of the set of relay nodes 106 associated with the select group of two or more groups of source nodes. In some examples, an individual source node (e.g. source node 112) may be arranged to send one or more data packets to the associated single relay node (e.g. relay node 122). As discussed above, such a transmission of packets may be scheduled based at least in part on instructions to transmit via a channel state information feedback from the portion of the set of relay nodes 106 associated with the select group of two or more groups of source nodes.

At operation 512, packets transmitted one or more of source nodes 102 may be decoded and/or buffered via to the portion of the set of relay nodes 106 associated with the select group of two or more groups of source nodes for further transmission to corresponding destination nodes 104. In some examples, an individual source node (e.g. source node 112) may be arranged to send one or more data packets to the associated single relay node (e.g. relay node 122) that may be decoded and/or buffered for further transmission to a corresponding destination node (e.g. destination node 212). As illustrated, relay nodes 106 may perform a half duplex communication process between pairs of source nodes 102 and destination nodes 104.

At operation 514, one or more of relay nodes 106 may be adapted to send a pilot signal to the set of destination nodes 104. In some examples, such a pilot signal may include a channel state information (CSI) signal. At operation 516, one or more destination nodes 104 may be arranged to determine a reliability metric based at least in part on such a pilot signal. In examples where such a pilot signal may include a channel state information signal, such a reliability metric may be determined based at least in part on the channel state information signal. At operation 518, one or more destination nodes 104 may be arranged to determine a select relay node (e.g. relay node 122) to be scheduled for service based at least in part on the determined reliability metric. For example, such a selection may be made based at least in part on a comparison of reliability metrics associated with two or more of relay nodes 106 to find a reliable connection from relay nodes 106 to destination nodes 104.

At operation 520, one or more of relay nodes 106 may be adapted to receive a channel state information feedback from the one or more destination nodes 104. Such a channel state information feedback may be adapted to instruct an individual relay node (e.g. relay node 122) to transmit or not to transmit based at least in part on the previously determined reliability metric. For example, an individual relay node (e.g. relay node 122) may be instructed to transmit via a channel state information feedback based at least in part on a comparison of reliability metrics associated with two or more of relay node (e.g. relay node 122) to find a reliable connection from relay nodes 106 to destination nodes 104. In some examples, the channel state information feedback may be represented by a binary digit integer value (e.g. a "1" or a "0").

At operation 522, one or more of relay nodes 106 may be adapted to send one or more data packets to the scheduled destination node (e.g. destination node 212). As discussed above, such a transmission of packets may be scheduled based at least in part on instructions to transmit via a channel state information feedback from the destination node (e.g. destination node 212).

Figure 6:
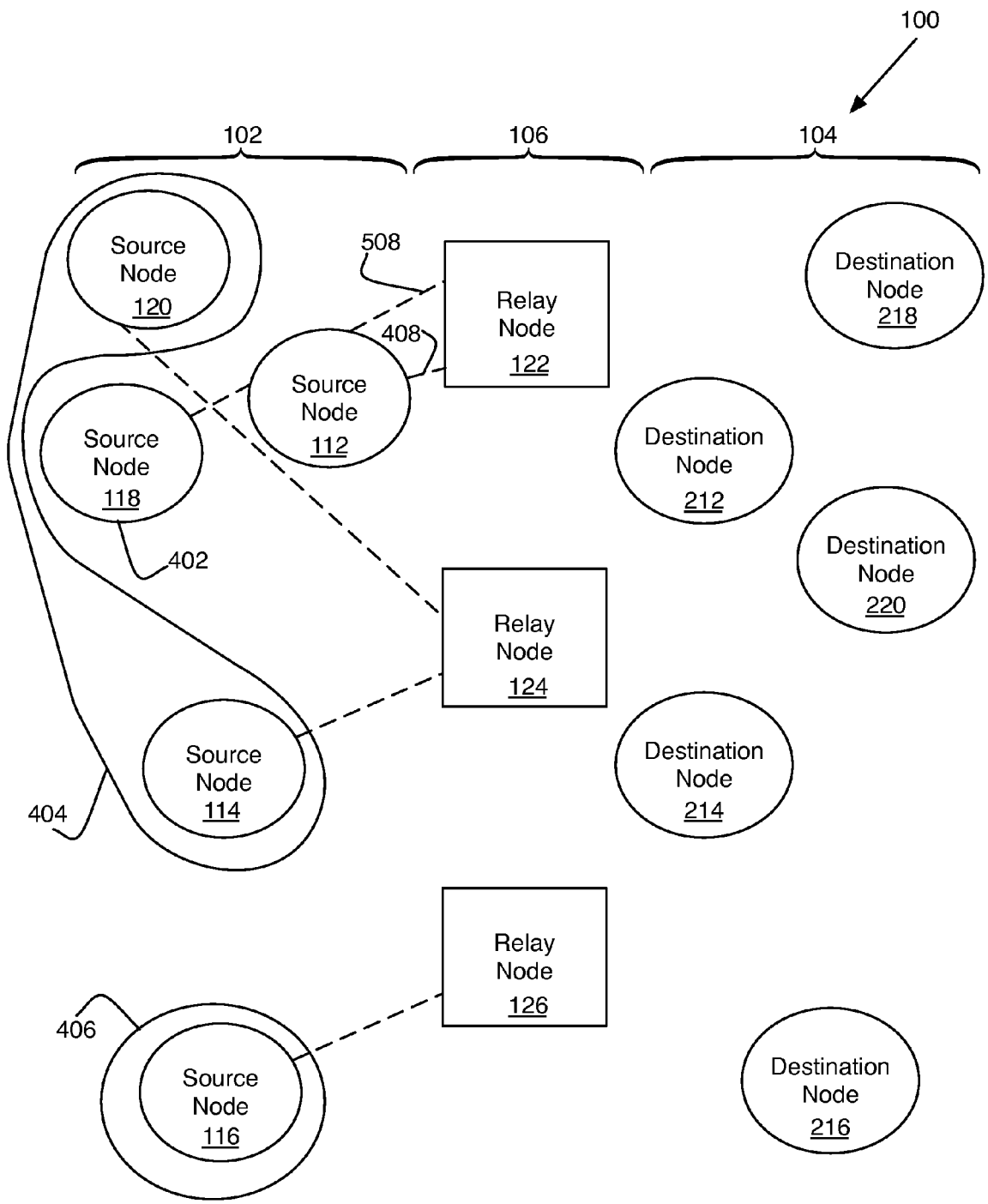
FIG. 6 illustrates a diagram of an example wireless communication network illustrating the operation of the example process of FIG. 5.

FIG. 6 illustrates a diagram of an example wireless communication network illustrating the operation of the example process of FIG. 5, in accordance with one or more example implementations. Once one of source nodes 102 is assigned and/or reassigned to one of the groups 402/404/406, such assigned and/or reassigned source nodes 102 may be configured to send a relay specific pilot signal (illustrated by the dashed lines) to the associated relay nodes 106. In some examples, an individual source node (e.g. source node 112) may be configured to send a relay specific pilot signal (e.g. relay specific pilot signal 408) to the associated single relay node (e.g. relay node 122). Similarly, in the illustrated example, source node 118 of group 402 may also be configured to relay specific pilot signal 508 to the associated single relay node (e.g. relay node 122).

The portion of the set of relay nodes 106 associated with the select group of two or more groups of source nodes may be configured to determine a reliability metric based at least in part on such relay specific pilot signals. For example, relay node 122 may be configured to determine a reliability metric based at least in part on relay specific pilot signal 408 and may determine a reliability metric based at least in part on relay specific pilot signal 508. The portion of the set of relay nodes 106 associated with the select group of two or more groups of source nodes may be configured to determine a select source node (e.g. source node 112) assigned to the associated group of source nodes 402 to be scheduled for service based at least in part on the determined reliability metric. For example, such a selection may be made based at least in part on a comparison of reliability metrics associated with relay specific pilot signal 408 and relay specific pilot signal 508.

One or more of source nodes 102 may be configured to receive a channel state information feedback from the portion of the set of relay nodes 106 associated with the select group of two or more groups of source nodes. In the illustrated example, an individual source node (e.g. source node 112) may be configured to receive a channel state information (CSI) feedback from the associated single relay node (e.g. relay node 122) that may instruct the individual source node (e.g. source node 112) to transmit. Likewise, in the illustrated example, an individual source node (e.g. source node 118) may be configured to receive a channel state information (CSI) feedback from the associated single relay node (e.g. relay node 122) that may instruct the individual source node (e.g. source node 118) not to transmit.

In operation, centrally coordinated scheduling and/or detailed channel state information signals may not be utilized at a transmitter side of the communication process (source nodes 102 for the first communication hop, and relay nodes 106 for the second communication hop). In some of the examples herein, source nodes 102 may be adapted to operate in a distributed fashion, without cooperation among one another. Likewise, relay nodes 106 may be adapted to operate in a distributed fashion, without cooperation among one another. Similarly, destination nodes 104 may be adapted to operate in a distributed fashion, without cooperation among one another. At each communication hop, a subset of source nodes 102 or destination nodes 104 that can benefit from multiuser diversity may be scheduled for service. For example, to select the source nodes 102 or destination nodes 104 for each communication hop, a channel state information signal may be communicated to receivers (relay nodes 106 for the first communication hop, and destination nodes 104 for the second communication hop) and an integer-value channel state information feedback to the transmitters (source nodes 102 for the first communication hop, and relay nodes 106 for the second communication hop).

Further, in operation, grouping of source nodes 102 may reduce overhead associated with the channel state information feedback. For example, as the number of source nodes 102 increases, the amount of overhead that is associated with the channel state information feedback may likewise increase.

FIG. 7 illustrates an example computer program product 700 that is arranged in accordance with at least some examples of the present disclosure. Program product 700 may include a signal bearing medium 702. Signal bearing medium 702 may include one or more machine-readable instructions 704, which, if executed by one or more processors, may operatively enable a computing device to provide the functionality described above with respect to FIG. 3 and/or FIG. 5. Thus, for example, referring to the system of FIG. 4 and/or FIG. 6, source nodes 102, destination nodes 104, and/or relay nodes 106 may undertake one or more of the actions shown in FIG. 3 and/or FIG. 4 in response to instructions 704 conveyed by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.).

Figure 8:
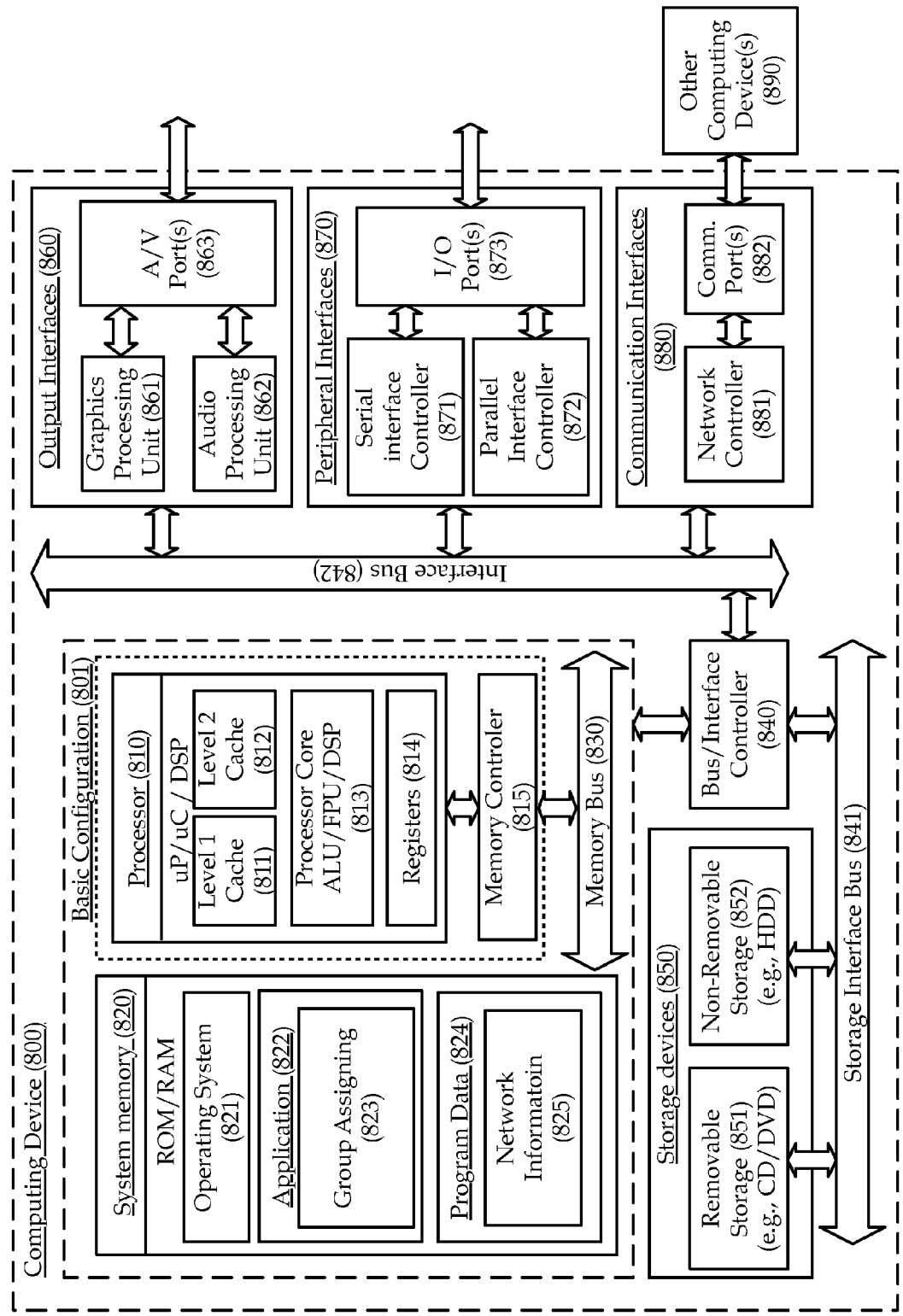
FIG. 8 is a block diagram illustrating an example computing device, all arranged in accordance with the present disclosure.
Figure 1:
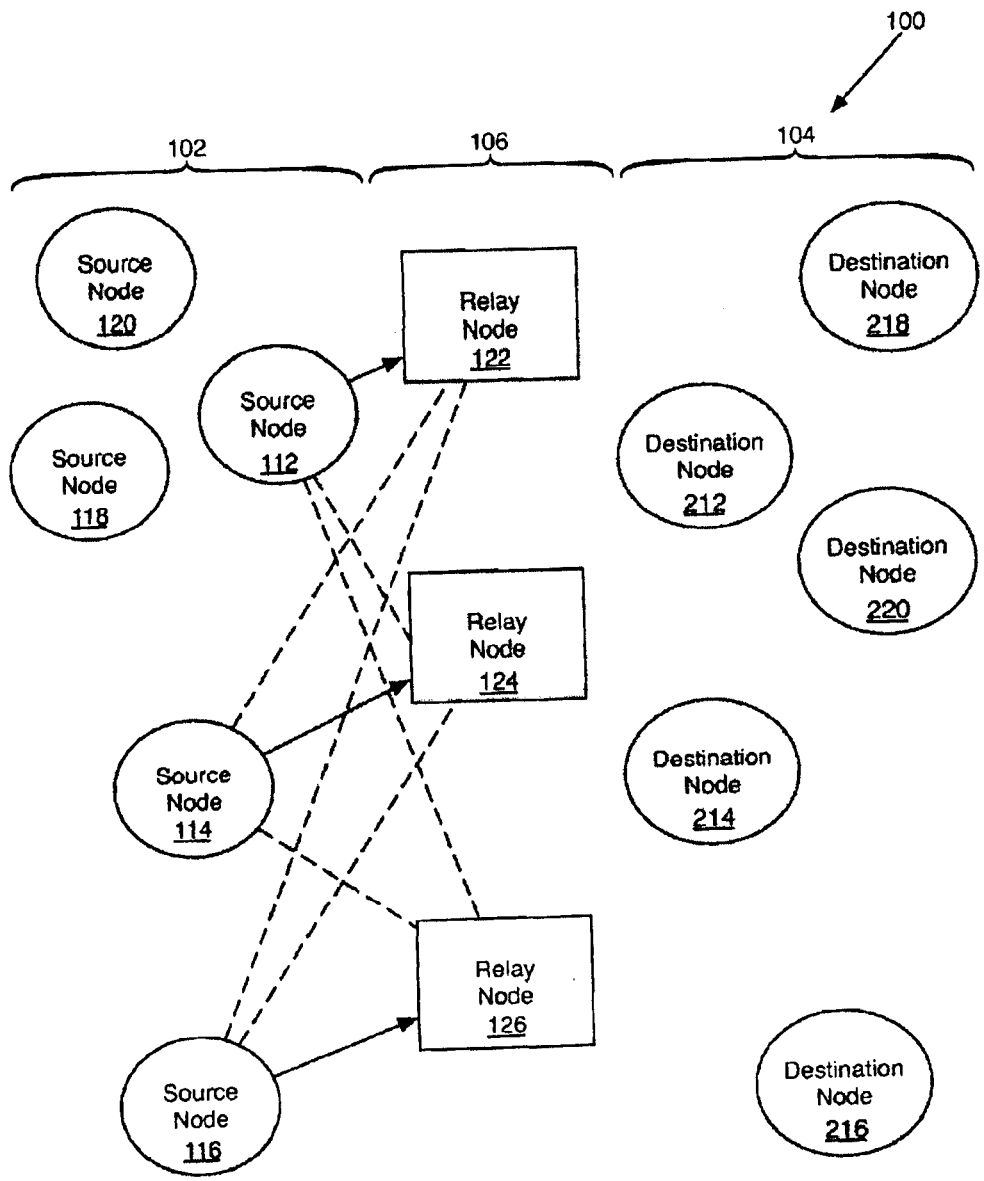
Figure 8:
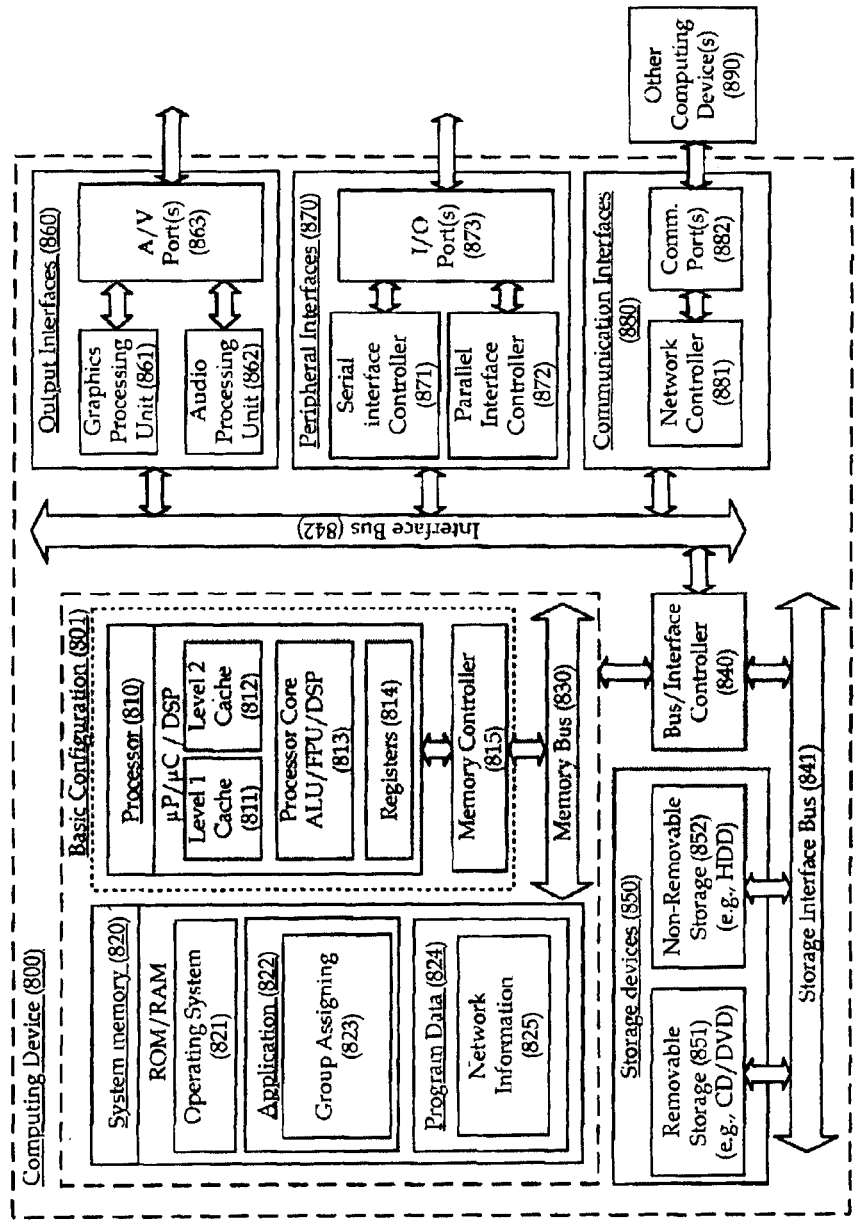

FIG. 8 is a block diagram illustrating an example computing device 800 that is arranged in accordance with the present disclosure. In one example configuration 801, computing device 800 may include one or more processors 810 and system memory 820. A memory bus 830 may be used for communicating between the processor 810 and the system memory 820.

Depending on the desired configuration, processor 810 may be of any type including but not limited to a microprocessor (µP), a microcontroller (µC), a digital signal processor (DSP), or any combination thereof. Processor 810 may include one or more levels of caching, such as a level one cache 811 and a level two cache 812, a processor core 813, and registers 814. The processor core 813 may include an arithmetic logic unit (ALU), a floating point unit (FPU), a digital signal processing core (DSP Core), or any combination thereof. A memory controller 815 may also be used with the processor 810, or in some implementations the memory controller 815 may be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Application 822 may include a source node group assigning algorithm 823 in a wireless communication network that is arranged to perform the functions as described herein including the functional blocks and/or actions described with respect to process 300 of FIG. 3 and/or process 500 of FIG. 5. Program Data 824 may include data 825 for use with source node group assigning algorithm 823, for example, data corresponding to network information. In some example embodiments, application 822 may be arranged to operate with program data 824 on an operating system 821 such that implementations of assigning of source node groups may be provided as described herein. For example, source nodes 102, destination nodes 104, and/or relay nodes 106 may comprise all or a portion of computing device 800 and be capable of performing all or a portion of application 822 such that implementations of assigning of source node groups may be provided as described herein. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to the basic configuration 801 via the bus/interface controller 840. Example output interfaces 860 may include a graphics processing unit 861 and an audio processing unit 862, which may be configured to communicate to various external devices such as a display or speakers via one or more A/V ports 863. Example peripheral interfaces 860 may include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 890 over a network communication via one or more communication ports 882. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 may also be implemented as a personal computer including both laptop computer and non-laptop computer configurations. In addition, computing device 800 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method implemented in a source node of a wireless communication network that includes a plurality of source nodes, wherein the source node includes a mobile electronic device, the method comprising:
   receiving, by the source node, feedback information from destination nodes, wherein the feedback information is decoded and buffered by a set of relay nodes in the wireless communication network and, wherein the feedback information includes channel state information;
   in response to an increase in a size of the wireless communication network, increasing feedback information overhead associated with calculation of a reliability metric, wherein the reliability metric is computed by the destination nodes and is based at least in part on a measured signal strength of a pilot signal sent from the source node to the destination nodes;
   assigning, by the source node, the source node to a first group of two or more groups of the source nodes based on one or more of the feedback information and network size information that includes a number of the plurality of source nodes of the wireless communication network, wherein the first group of the two or more groups of the source nodes is associated with a portion of the set of relay nodes;
   sending one or more data packets to the portion of the set of relay nodes associated with the first group of the two or more groups of the source nodes; and
   receiving a reassignment of the source node to a second group of the two or more groups of the source nodes based on a proportional distribution of a set of source nodes among the two or more groups of the source nodes, wherein the proportional distribution includes one or more of an equal distribution, an approximately equal distribution, and a distribution with a specified tolerance of the set of the source nodes among the two or more groups of the source nodes.

2. The method of claim 1, further comprising:
   sending a relay specific pilot signal to the portion of the set of relay nodes associated with the first group of the two or more groups of the source nodes.

3. The method of claim 1, further comprising:
   sending a channel state information signal to the portion of the set of relay nodes associated with the first group of the two or more groups of the source nodes, wherein the sending of the one or more data packets comprises sending the one or more data packets scheduled for service based at least in part on the channel state information.

4. The method of claim 3, wherein the channel state information is represented by a binary digit integer value.

5. The method of claim 1, wherein the portion of the set of relay nodes includes a single relay node.

6. The method of claim 1, wherein the set of relay nodes includes infrastructure nodes.

7. The method of claim 1, wherein the wireless communication network comprises a half-duplex system.

8. A method implemented in a portion of a set of relay nodes in a wireless communication network, comprising:
   receiving a channel state information signal from a source node assigned to a first group of two or more groups of source nodes of a plurality of source nodes of the wireless communication network, wherein the first group of the two or more groups of the source nodes is associated with the portion of the set of relay nodes and wherein the source node includes a mobile electronic device;
   sending network information to the source node, the network information comprising:
      network size information, wherein the network size information comprises a number of the plurality of source nodes of the wireless communication network, and
      a channel state information feedback, wherein the channel state information feedback is sent from destination nodes, wherein the channel state information feedback is decoded and buffered by the set of relay nodes, and is based at least in part on a reliability metric computed by the destination nodes and, wherein the reliability metric is based at least in part on a measured signal strength of a pilot signal sent from the source nodes to the destination nodes;
   receiving one or more data packets from a select source node scheduled for service based at least in part on the sent network information including the channel state information feedback;
   in response to an increase in size of the wireless communication network, increasing channel state information feedback overhead associated with calculation of the reliability metric; and
   determining an assignment of the select source node to the first group of the two or more groups of the source nodes based on a proportional distribution of a set of source nodes among the two or more groups of the source nodes, wherein the proportional distribution includes one or more of an equal distribution, an approximately equal distribution, and a distribution with a specified tolerance of the set of the source nodes among the two or more groups of the source nodes.

9. The method of claim 8, further comprising:
   determining the reliability metric based at least in part on the channel state information signal; and
   determining the select source node is scheduled for service based on the determined reliability metric.

10. The method of claim 8, wherein the channel state information feedback is represented by a binary digit integer value.

11. The method of claim 8, wherein the portion of the set of relay nodes includes a single relay node.

12. The method of claim 8, wherein the set of relay nodes includes infrastructure nodes.

13. An article for use with a portion of a set of relay nodes in a wireless communication network, comprising:
a non-transitory signal bearing medium comprising machine-readable instructions stored thereon, which, if executed by one or more processors, operatively enable a computing device to:
identify a channel state information signal received from a source node assigned to a first group of two or more groups of source nodes of a plurality of source nodes of the wireless communication network, wherein the first group of the two or more groups of the source nodes is associated with the portion of the set of relay nodes and wherein the source node includes a mobile electronic device;
send network information to the source node, the network information comprising:
network size information, wherein the network size information includes the number of the plurality of source nodes of the wireless communication network, and
a channel state information feedback, wherein the channel state information feedback is sent from destination nodes, wherein the channel state information feedback is decoded and buffered by the set of relay nodes, and is based on a reliability metric computed by the destination nodes and, wherein the reliability metric is based at least in part on a measured signal strength of a pilot signal sent from the source nodes to the destination nodes;
identify one or more data packets received from a select source node scheduled for service based at least in part on the sent network information including the channel state information feedback;
in response to an increase in size of the wireless communication network, increase channel state information feedback overhead associated with calculation of the reliability metric; and
determine an assignment of the select source node to the first group of the two or more groups of the source nodes based on a proportional distribution of a set of source nodes among the two or more groups of the source nodes, wherein the proportional distribution includes one or more of an equal distribution, an approximately equal distribution, and a distribution with a specified tolerance of the set of the source nodes among the two or more groups of the source nodes.

14. The article of claim 13, wherein the machine-readable instructions further operatively enable the computing device to:
determine the reliability metric based at least in part on the channel state information signal; and
determine the select source node is to be scheduled for service based on the determined reliability metric.

15. A wireless communication network, comprising:
a plurality of source nodes, at least one of the source nodes being configured to:
receive, via a source node, feedback information from destination nodes, the feedback information is one or more of decoded and buffered by one or more relay nodes of a set of relay nodes of the wireless communication network, wherein the feedback information comprises channel state information;
in response to an increase in size of the wireless communication network, increase feedback information overhead associated with calculation of a reliability metric, wherein the reliability metric is computed by the destination nodes and is based at least in part on a measured signal strength of a pilot signal sent from the source node to the destination nodes;
assign, via the source node, wherein the source node includes a mobile electronic device, the source node to a first group of two or more groups of the source nodes based on one or more of feedback information and network size information including a number of the plurality of source nodes of the wireless communication network, wherein the first group of the two or more groups of the source nodes is associated with a portion of the set of relay nodes;
send, via the source node, one or more data packets to the portion of the set of relay nodes associated with the first group of the two or more groups of the source nodes; and
receive, via the source node, a reassignment of the source node to a second group of the two or more groups of the source nodes based on a proportional distribution of a set of source nodes among the two or more groups of the source nodes, wherein the proportional distribution includes one or more of an equal distribution, an approximately equal distribution, and a distribution with a specified tolerance of the set of the source nodes among the two or more groups of the source nodes.

16. The wireless communication network of claim 15, wherein the at least one source node of the plurality of source nodes is further configured to:
send a relay specific pilot signal to the portion of the set of relay nodes associated with the first group of the two or more groups of the source nodes.

17. The wireless communication network of claim 15, wherein the at least one of the plurality of source nodes is further configured to:
send a channel state information signal to the portion of the set of relay nodes associated with the first group of the two or more groups of the source nodes;
receive a channel state information feedback from the portion of the set of relay nodes associated with the first group of the two or more groups of the source nodes, wherein the channel state information feedback is based at least in part on a reliability metric associated with the channel state information signal; and
send the one or more data packets scheduled for service based at least in part on the channel state information feedback.

18. The wireless communication network of claim 17, wherein the channel state information feedback is represented by a binary digit integer value.

* * * * *

UNITED STATES PATENT AND TRADEMARK OFFICE
CERTIFICATE OF CORRECTION

PATENT NO. : 8,885,514 B2
APPLICATION NO. : 12/512792
DATED : November 11, 2014
INVENTOR(S) : Cui et al.

Page 1 of 3

It is certified that error appears in the above-identified patent and that said Letters Patent is hereby corrected as shown below:

On the Title Page, in item (56), under "OTHER PUBLICATIONS", in Column 2, Line 17, delete "et la.," and insert -- et al., --, therefor.

In the Drawings

Delete drawing sheet 1 and substitute the attached drawing sheet 1, therefor.

Delete drawing sheet 8 and substitute the attached drawing sheet 8, therefor.

In the Specification

In Column 10, Lines 35-36, delete "peripheral interfaces 860" and insert -- peripheral interfaces 870 --, therefor.

In Column 11, Line 56, delete "and or" and insert -- and/or --, therefor.

Signed and Sealed this
Second Day of June, 2015

Michelle K. Lee
*Director of the United States Patent and Trademark Office*